T. F. HEMMICH.
Hot-Air Furnace.

No. 222,782. Patented Dec. 23, 1879.

Witnesses
Frank P Kinsey
Frank Hartman

Inventor
Thomas F Hemmich
Per Thomas P Kinsey
Atty

4 Sheets—Sheet 2.
T. F. HEMMICH.
Hot-Air Furnace.
No. 222,782. Patented Dec. 23, 1879.
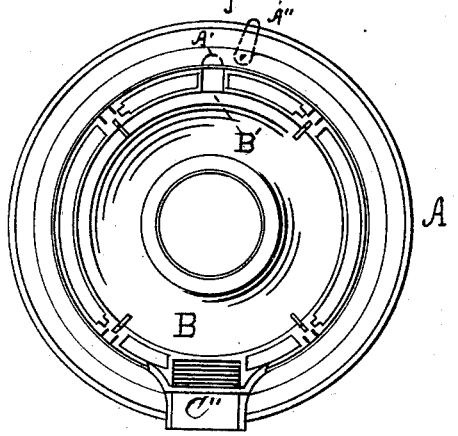
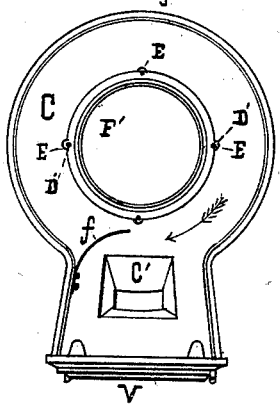
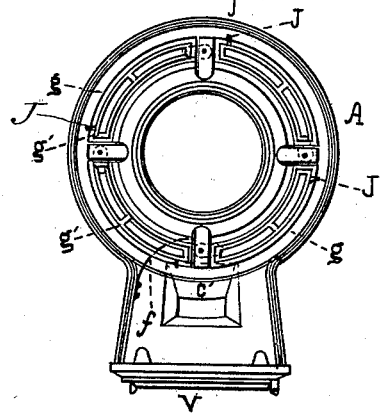
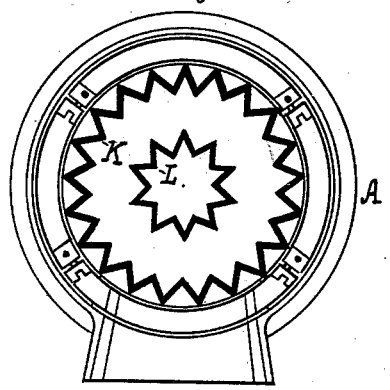
Witnesses
Frank P Kinsey
Frank Hartman
Inventor
Thomas F Hemmich
Per Thomas P Kinsey
Atty 4 Sheets—Sheet 3.

T. F. HEMMICH.
Hot-Air Furnace.

No. 222,782. Patented Dec. 23, 1879.

Witnesses
Frank P Kinsey
Frank Hartman

Inventor
Thomas F Hemmich
Per Thomas P Kinsey
Atty

T. F. HEMMICH.
Hot-Air Furnace.
No. 222,782. Patented Dec. 23, 1879.
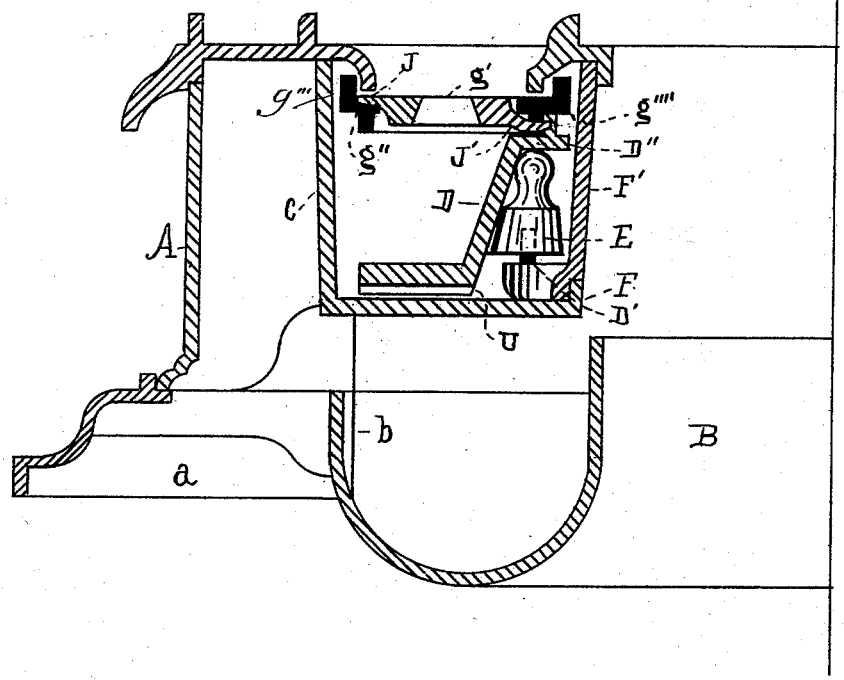
Witnesses
Frank P Kinsey
Frank Hartman
Inventor
Thomas F Hemmich
Per Thomas P Kinsey
Atty

UNITED STATES PATENT OFFICE.

THOMAS F. HEMMICH, OF READING, PENNSYLVANIA, ASSIGNOR OF ONE-HALF OF HIS RIGHT TO ASAPH PRUTZMAN, OF SAME PLACE.

IMPROVEMENT IN HOT-AIR FURNACES.

Specification forming part of Letters Patent No. 222,782, dated December 23, 1879; application filed August 14, 1879.

*To all whom it may concern:*

Be it known that I, THOMAS F. HEMMICH, of the city of Reading, county of Berks, State of Pennsylvania, have invented certain new and useful Improvements in the Construction of Hot-Air Furnaces, of which the following is a specification.

The object of my improvement is to simplify the construction, to increase the heating-surface, to lessen the risk of overheating the interior surfaces of an annular heater, and to make easy the renewal of those parts of the heater liable to wear.

I am aware that centrally-fired or annular heaters are not new—*vide* patent 171,281, of December 21, 1875, and several others, notably my own improved patent 217,794, of July 22, 1879—and therefore do not broadly claim the same.

The difficulty with heaters of this class has been, in certain stages of atmospheric change, to prevent the burning out of the interior or central cylinder, and various attempts have been made to overcome this objection; but until now I do not know of any successful result.

By the adoption of an annular vapor-pan located in the base of the stove, and so arranged that a large proportion of the entering cold air shall pass through, around, and over it, the problem has been solved, for the greater the heat the greater the radiation upon and the more rapid the evaporation of the water, the vapor of which, rising through the directing central tube, impinges upon the wall of the cylinder, and rapidly reduces the overheated surface to its normal state.

The liability to sudden changes of temperature of the interior wall of the fire-pot requires that special provision shall be made to meet it. This I have done by the adoption of star radiating corrugations in the vertical face of the cylinder. This permits the expansion and contraction of the central portion of the cylinder to an unlimited extent without affecting the joints. The radiations are reduced to a plain surface, of sufficient strength to resist the strain of the central portion, at the top and base of the cylinder, where the joints are made.

I am also aware that it is not new to make provision in stoves for the introduction of atmospheric air in jets or streams for the purpose of burning bituminous coal or light fuels, R. F. Brown having patented a device for that purpose November 1, 1870, and Wood, Patent No. 214,799, April 29, 1879, for the same purpose, the latter using a projecting circular tube, with its inner end cut off at an angle of about forty-five degrees and closed, the closed end being pierced with two or more oblong slots. This tube revolved in connection with a register on the outside of the door, and was more especially designed for burning straw or very light fuel.

The Brown apparatus comprised a telescopic tube sliding in a female tube provided in the door of the stove. This tube is perforated with small holes at its interior end. The outside or exterior end is covered with a register. To open or close the door it would be necessary to draw the tube out about one-half of its length.

My tube, although circular where attached to the door, is flattened at its extreme end, so as to deliver the air in a thin stratum, which I have found, in practice, to be the best mode of delivery. My tube is also stationary, and requires no manipulation before opening or closing the door.

Referring to the drawings in explanation of my improvements, Figure 1 is a half-front and half-sectional elevation of my annular heater, in which A is the wall or base ring; B, the vapor-pan; C, the ash-pit; D, the grate-apron; E, the supporting and guiding rollers for the apron; F, seat of the central air-current directing and supporting thimble F', upon which rest the shield and seat H', internal fire-pot L, reverse cones Q R, and top smoke-flue, S. $g$ is the grate-frame, supported by and attached to the apron D, and in which are suspended the grates $g'$ by the pivot J, the opposite pivot, J', being supported on the top of the apron-cone D. H is the external shield and support for the outside casing and exterior fire-pot K, chute-section M, top reverse cone, P, and smoke-flue S, with outlet S'. The combining section or smoke-flue S is made with recurved flanges resting in a sand joint. The hooked bolts T rest upon the flange when loose, and permit the adjustment of the chute-section M or the smoke-flue section S with outlet S' in any desired position relative to each other, and, when screwed up, retain the sections permanently in place.

Fig. 2 is a plan of the wall-plate A and vapor-pan B, with filling-hole A' and cover A''.

Fig. 3 is a plan of the ash-pit C, with directing and supporting thimble F and apron guiding and supporting rollers E and discharge-guard f.

Fig. 4 is a plan of the wall-plate A, showing the grate-frame g and grate-sections g' g', &c., in place.

Fig. 5 is a plan section on the line x x' of Fig. 1, showing the construction of the exterior and interior walls of the annular fire-pots K and L.

Figure 8:
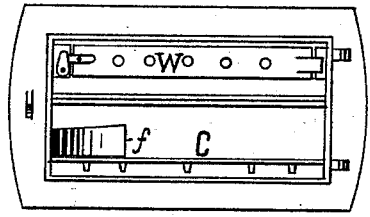

Fig. 8 is a front and enlarged view of the slate or cinder door W, as seen through the opening V of the ash-pit C. The base of the door W forms a continuation of the downward projection of the shield H, and this, as long as it is closed, locks the grates g' in the grate-frame g. To remove a grate, the frame or grate-bearer g is rotated until the desired grate is brought in front of the cinder-door, which, being opened, the grate can be withdrawn or replaced. f is the discharging-scraper, resting on the floor of the apron D.

Figure 9:
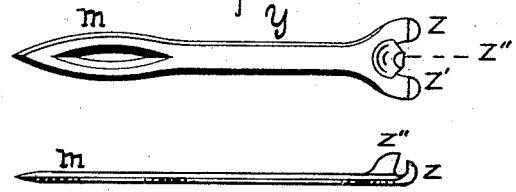

Fig. 9 is a plan and side view of my improved spanner Y, which is bifurcated opposite the handle M, the ends Z Z' being curved or bent, and having also at the same end the projecting stud Z''. If the ends Z Z' are hooked over the upward-projecting ledge of the grate-frame g, with the stud Z'' against the periphery of the same, the spanner becomes self-supporting, and the grate-frame may be shaken back and forth, or revolved in either direction, with very slight effort.

Figure 10:
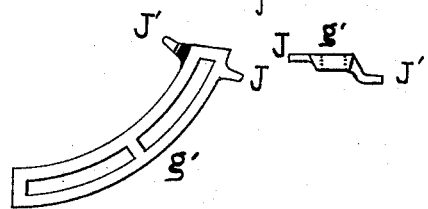

Fig. 10 is a plan and end view of the sectional grates g' g' with pivots J J', the end view showing the arrangement of the same. The outer pivot, J, rests in the grate-frame g, while the inner pivot, J', rests upon the cone of the apron D. This causes the end of the grate opposite the pivots, when released from the buttons h h, to swing outward and away from the cone of the apron D.

Fig. 11 is an enlarged partial section of the lower part of the heater, designed to show more clearly the support of the grates g' by means of the pivots J J' resting, respectively, upon the grate-frame g and the top ledge, D''; of the apron-cone D, for the purpose already set forth in the body of the specification.

Similar letters in all the figures refer to similar parts.

The vapor-pan being centrally located, all the vapor or moisture which arises from the surface of the water becomes intimately mixed with the current of air passing through, around, and over the vapor-pan, and, by correcting the dryness of the heat, prevents the burning out of the interior cylinder. The pan has a spout, B', projecting from a point on its circumference to and under a hole, A', in the base of the wall-plate ring A. This hole is covered with a door, A''. The spout B' is somewhat below the level of the top of the vapor-pan, and when filling the pan any surplus water poured into the hole A' will vent itself at the same point, and thus prevent a flooding of the interior of the furnace. By this arrangement of the vapor-pan the air is also delivered moist to the rooms above.

The ash-pit C rests upon brackets b, projecting from the vapor-pan B, thus leaving an air-space between them.

The directing-thimble F' is provided at four points on its external face (at the base) with four studs, surmounted or capped with cone-shaped friction-rollers E. The top of apron D rests upon the tops of the rollers E, while the cone of the apron D lies against the conical face of the friction-rollers E. This gives a very easy movement to the grate-frame for revolving or shaking, and effectually retaining the apron concentric with the ash-pit C and cylinders K and L.

The annular rings H H', being seats for the cylinders K L and caps for the plate A and thimble F, respectively, are constructed with a drooping or overhanging edge next to the grate-frame, this overhanging part locking the grates g' in place, and preventing the entrance of coal between the grate-frame g, thimble F', and ash-pit C.

The sectional grates g' are hung on pivots J J' at one end, and supported by buttons h at the other.

Figure 1:
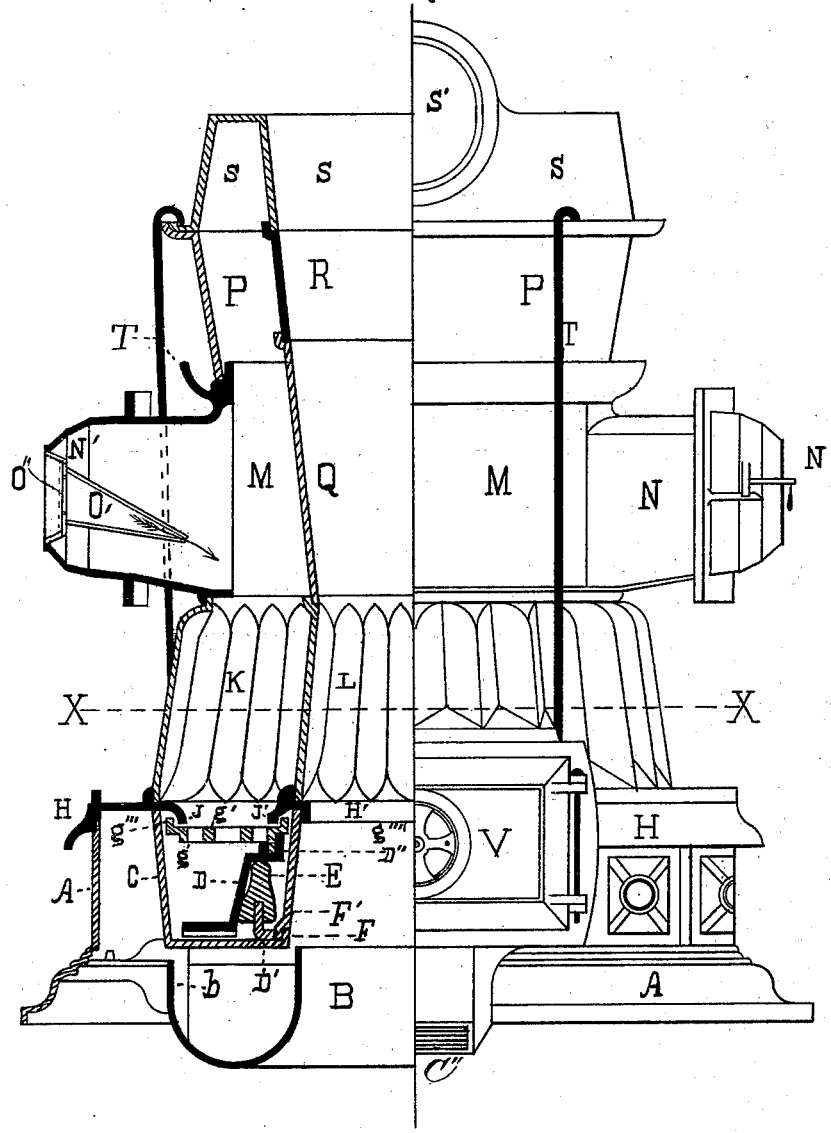
Figure 6:
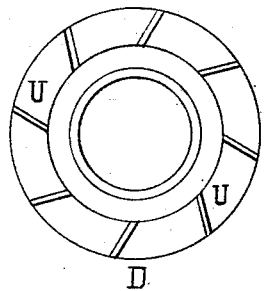
Fig. 6 is a reverse plan of the apron D, showing the scrapers U, by means of which, in the revolution of the grate-frame g and apron D in the direction of the arrow on Fig. 3, the floor of the ash-pit C is cleared of ashes.
Figure 7:
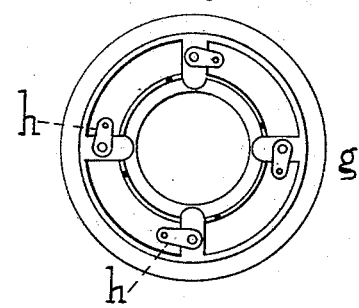
Fig. 7 is a reverse plan of the grate-frame g, showing the buttons h h, &c., by means of which the grates g' are kept in place, and also dropped for cleaning by turning the button to one side.

The exterior fire-pot wall, K, and interior fire-pot wall, L, are constructed as shown in elevation in Fig. 1 and in section, Fig. 5, with star-radiating corrugations connected at base and top of wall by a non-corrugated ring of sufficient strength to retain its circular shape, while the vertical radiating portion held between the solid rings will expand and contract according to the state of the fire in the fire-pot.

The chute-section M is shown with two chutes, the chute N being of the ordinary style used for anthracite coal, while the chute N' is adapted to the burning of bituminous or soft coal.

The hollow flattened cone O', secured to the door O and covered with a register, O'', is constructed and arranged to throw a thin stratum of atmospheric air in contact with the smoke and gases arising from the burning fuel, which, on coming in contact with the air-current, becomes ignited, and is thus burned, preventing the deposit of soot, and assisting in the heating of the air passed through and around the heater.

P and R are sections of cones, for the purpose of lengthening out and increasing the heat-radiating surface of the heater.

The top or smoke-flue section, S, serves to combine the external and internal surfaces of the heater, and as an outlet for the products of combustion by the outlet-pipe S'.

Having described the construction and general arrangement of my hot-air heater, what I claim is as follows, to wit:

1. The combination of an annular vapor-pan, B, with the wall-plate A, and suspended concentrically in the same, the central opening being a directing-tube for the cold air to the thimble F or central hot-air flue of the stove, substantially as shown, and for the purpose described.

2. The annular ash-pit C, having a dust-opening, C', and seating F for thimble F', in combination with the thimble F', apron D, friction-rollers E, stud D', ash-pit door V, and wall-plate A, as shown and described.

3. The thimble F', with its capped friction-rollers E, for the support and guidance of the apron D, said rollers working upon studs D' in the ears of the thimble F', as shown and described.

4. The annular apron D, resting upon and against the friction-rollers E of the thimble F', and provided with a flange, D'', at its center-wall edge, upon and to which the grate-frame g is secured, the platform of the apron having upon its under side radiating ledges U and recessed bearings in the flanges D'', for the support of the lugs J' of the grates g', substantially as shown and described.

5. The sectional grates g', in combination with the annular grate-frame g, having recesses g'' in the outer annular rim for the grate-lugs J, with buttons or catches h on the under side, upon which the grates g' are supported at the end opposite to the lugs J J'.

6. The external fire-pot base-ring, H, in combination with and seated upon the wall-plate A, supporting the exterior fire-pot wall or cylinder, K, its interior edge drooping over but clear of the upward-projecting ledge g''' of the grate-frame g, substantially as shown and described.

7. The internal fire-pot base-ring, H', in combination with the apron-thimble F' and fire-pot wall or cylinder L, its outer annular edge drooping over the upward-projecting ledge g'''' of the grate-frame g without contact with the same, for the purpose described.

8. The gas-burner tube O', in combination with the hinged door N' and chute-section M, and having a register, O'', to regulate the admission of air, and the tube O', carried into the interior of the stove near to the fire-pot, being flattened horizontally to deliver a thin stratum of air, for the purpose described.

9. The grates g', provided with lugs J J', resting in the recess g'' in the grate-frame g, and in the recess provided in the apron D, the latter being some distance below the face of the grate, for the purpose described.

10. The spanner Y, with its lugs Z Z' and post Z'', in combination with the grate-frame g, for the purpose substantially shown and described.

THOMAS F. HEMMICH.

Witnesses:
   JOHN B. GRISSINGER,
   THOMAS P. KINSEY.